US008760680B2

(12) United States Patent
Tamashima

(10) Patent No.: US 8,760,680 B2
(45) Date of Patent: Jun. 24, 2014

(54) DATA PROCESSING APPARATUS, METHOD, AND STORAGE MEDIUM

(75) Inventor: Daisuke Tamashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 174 days.

(21) Appl. No.: 13/468,439

(22) Filed: May 10, 2012

(65) Prior Publication Data

US 2012/0307275 A1   Dec. 6, 2012

(30) Foreign Application Priority Data

Jun. 1, 2011   (JP) .................................. 2011-123366

(51) Int. Cl.
*G06K 15/00* (2006.01)
*G06F 3/12* (2006.01)

(52) U.S. Cl.
USPC .......................... 358/1.14; 358/1.15; 358/1.13

(58) Field of Classification Search
CPC . G06K 15/189; G06K 15/4095; G06F 3/1225
See application file for complete search history.

(56) References Cited

U.S. PATENT DOCUMENTS

2010/0134818 A1*   6/2010   Minamizono et al. ........ 358/1.13
2010/0315672 A1*   12/2010   Suzuki .......................... 358/1.15
2014/0029033 A1*   1/2014   Takahashi ..................... 358/1.13

FOREIGN PATENT DOCUMENTS

JP   2010-157208   7/2010

\* cited by examiner

*Primary Examiner* — Dov Popovici
(74) *Attorney, Agent, or Firm* — Oblon, Spivak, McClelland, Maier & Neustadt, L.L.P.

(57) ABSTRACT

A data processing apparatus makes adding, deleting, and changing of modification rules easy. The data processing apparatus includes an output destination type determining unit that determines type of output destination determined by an output destination determining unit using categorizing information, modification processing units that execute modifying processes different from each other on content of image data, a Plug-in Factory that determines the modifying process by referring to the determined type and content of modifying process set for each categorized type and generates modification processing units that execute the determined modifying processes, and a print commanding unit that requests modification processing units to execute the modifying process, generates output data from the modified image data, and sends the output data to the determined output destination. The content of the categorizing information and modifying process can be customized, and modification processing units can be added or deleted.

17 Claims, 11 Drawing Sheets

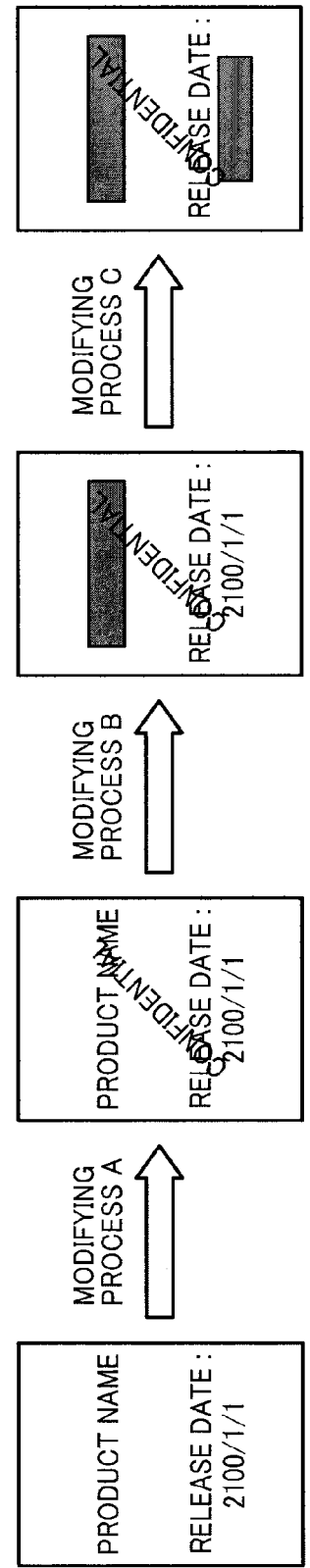

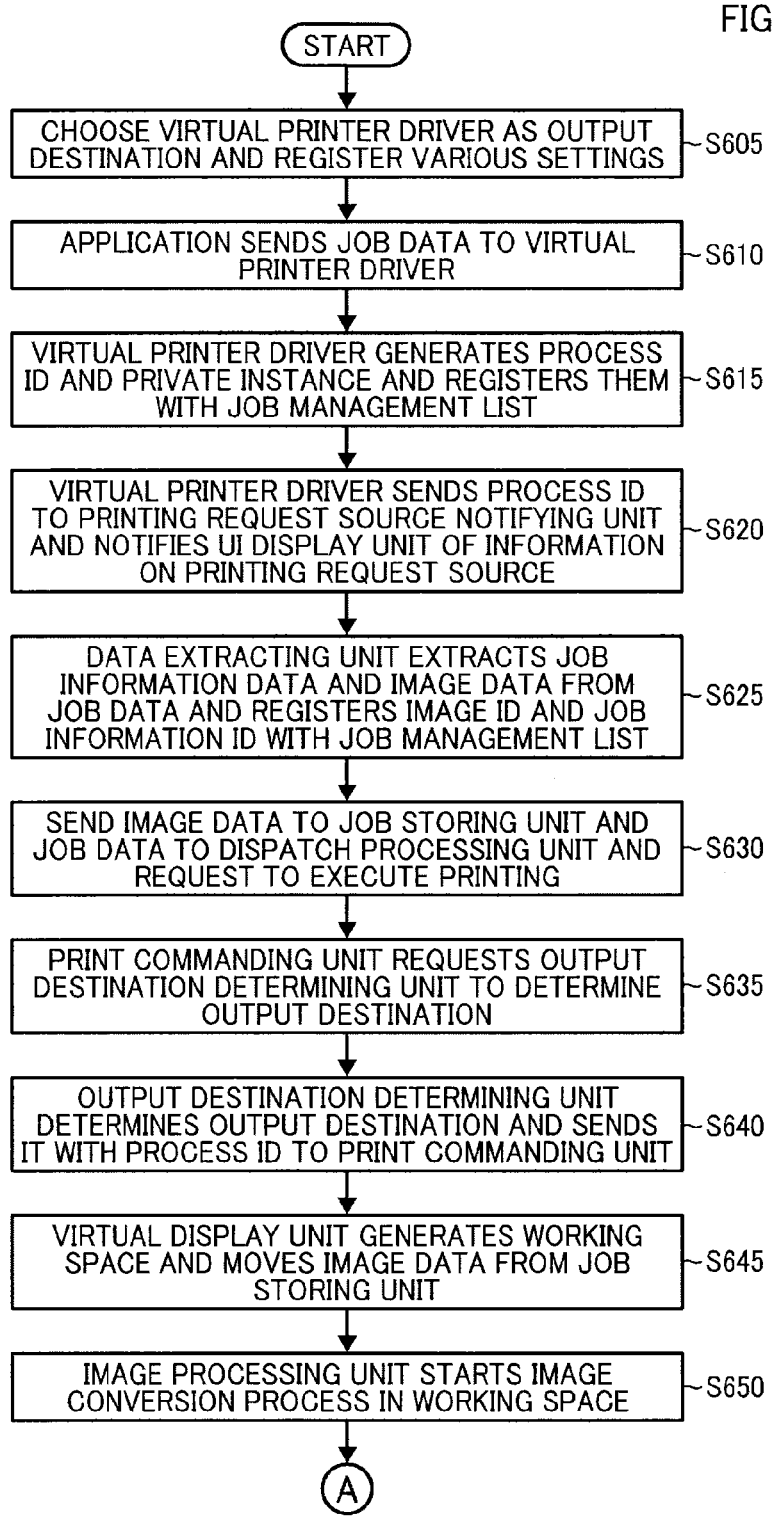

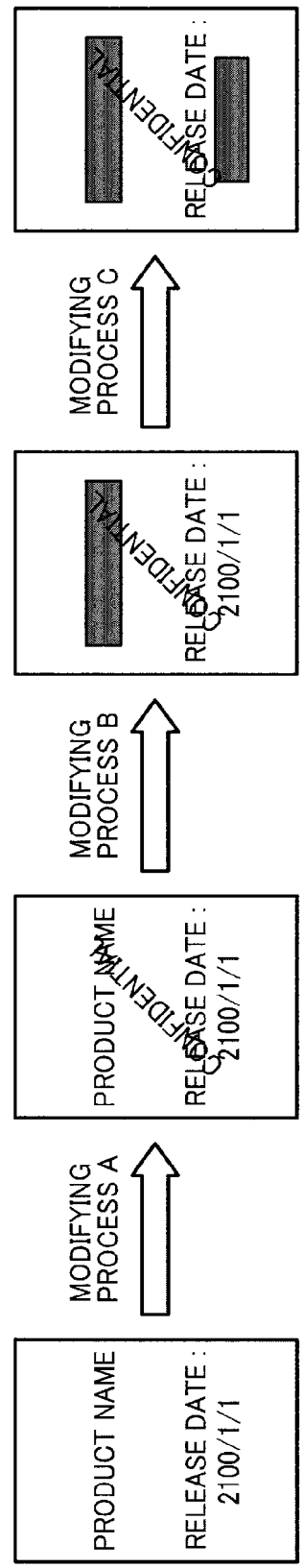

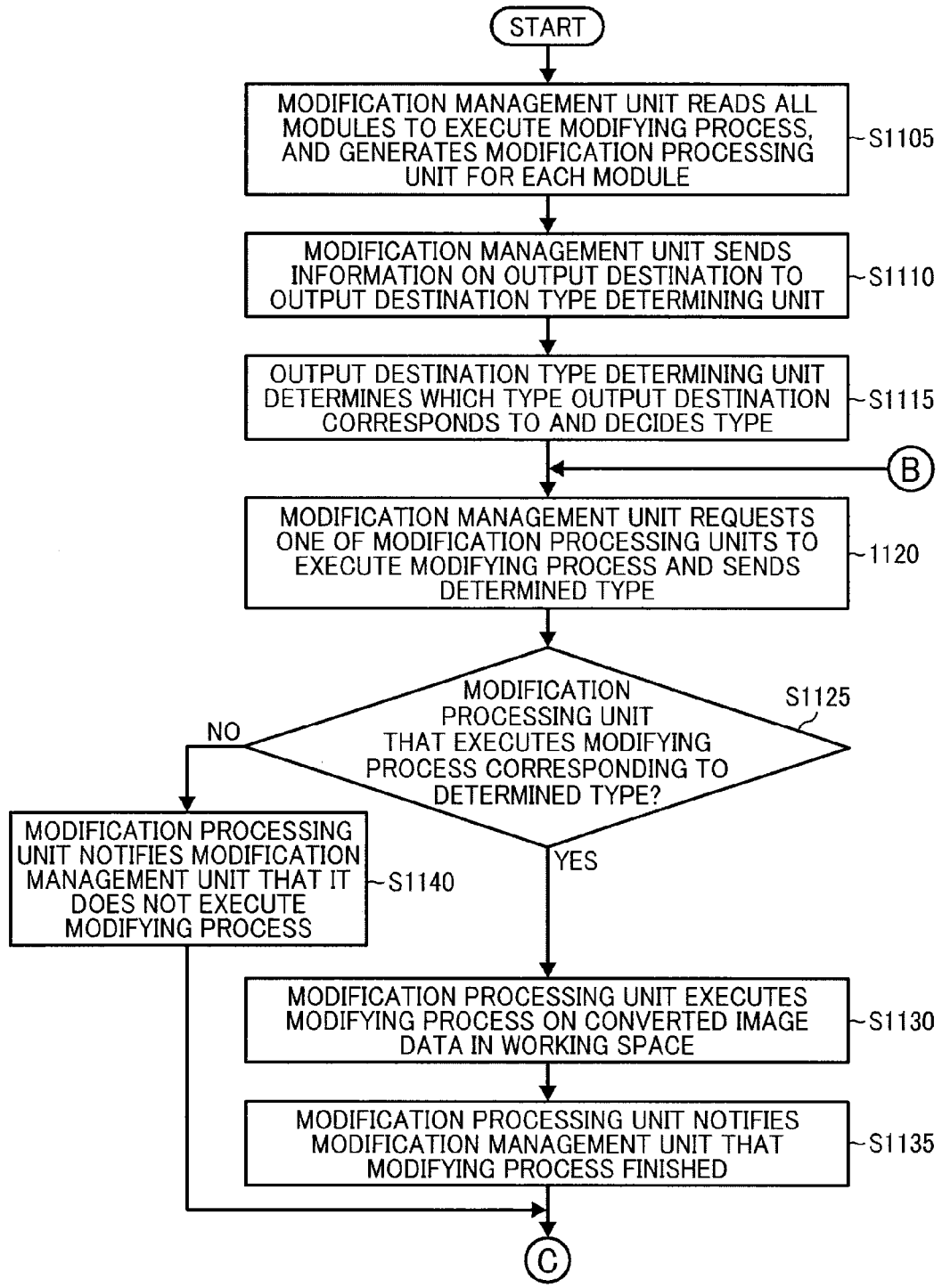

DATA PROCESSING APPARATUS, METHOD, AND STORAGE MEDIUM

CROSS-REFERENCE TO RELATED APPLICATION

This patent application is based on and claims priority pursuant to 35 U.S.C. §119 to Japanese Patent Application No. 2011-123366, filed on Jun. 1, 2011, the entire disclosure of which is hereby incorporated by reference herein.

BACKGROUND OF THE INVENTION

1. Field of the Invention

The present invention relates to a data processing apparatus that controls the destination of data output from an information processing apparatus, a data processing method, and a storage medium that stores a software program implementing the data processing method on a computer.

2. Description of the Related Art

Along with the popularization of network technology, a configuration now commonly employed features a plurality of personal computers (PCs) connected to a printer via a network in an office environment, with the PCs sharing the printer A printer server is connected to the network to manage printing and process printing requests from PCs appropriately so that the printer executes printing in good order even if a plurality of PCs send printing requests simultaneously.

In such an environment, a plurality of users send printing requests to a printer using their own PCs, and the printer executes printing when the printer receives printing requests from users. In this case, there is no problem if printing outputs are not confidential or not related to personal data etc., since it is not an issue if other users browse them. However, if printing outputs are confidential documents, it can be a serious matter if other users under no duty to maintain confidentiality browse those documents.

In addition, multi function peripherals (MFPs) with functions such as printing, copying, faxing, and scanning are often used as network-connected printers. MFPs can fax documents when they receive a request to send documents by fax from a user using a PC. In such an environment, there is always the risk that a user might fax an internal document by mistake, and that can lead to serious damage.

Generally speaking, in an office environment a plurality of printers and MFPs are connected to the network. In such an environment, instead of sending printing and facsimileing requests from a PC directly to the printer or MFP designated by the PC, an apparatus that controls the output destination by choosing an appropriate apparatus like a printer and executing printing on the appropriate apparatus has been proposed (e.g., JP-2010-157208-A.)

The apparatus described in JP-2010-157208-A is a data processing apparatus that manages printing outputs from a plurality of client PCs via a network and implements virtual printer drivers and a plurality of remote drivers. A virtual printer driver receives printing requests via the network, generates an intermediate file as a page image from print data corresponding to received printing requests, chooses a remote driver corresponding to destination printer information related to a client PC or a user, and loads the remote driver. The loaded remote driver generates output data including raw data from the generated intermediate file, sends the output data to the corresponding remote printer, and has the remote printer print the output data. Accordingly, the virtual printer driver changes the output destination to an output destination related to the client PC and the user.

Also, the virtual printer driver extracts a string (text data) included in the intermediate file and can determine whether or not a predefined keyword is included in the extracted string. If the predefined keyword is included in the extracted string, the virtual printer driver determines a printing condition corresponding to the predefined keyword, and sets the determined printing condition. After that, the virtual printer driver sets the printing condition to the remote driver and has the remote driver execute processes such as generating the raw data described above and adding page description language (PDL) commands. Accordingly, the virtual printer driver changes the output destination according to the string included in print data.

The conventional apparatus described above determines a destination printer using information specific to the client PC and the user who operates the client PC, and executes printing on the determined printer. With a plurality of output destinations, some of which are located in rooms anyone can enter, a security problem arises if a confidential document is printed on one of the apparatuses located in a room anyone can enter. The conventional apparatus can modify documents and print documents with tint block printing enabled in case the string "confidential" is included to prevent unauthorized copying and solve the security problem. Tint block printing is a feature that prints a tint block so that graphics or characters appear in the background of a copy if the printout is copied.

However, in the conventional apparatus a feature that has document modification rules is installed as a single module, so it is not easily possible to add another rule, delete a registered rule, or change a registered rule. It is necessary to replace module itself to add rules etc, and that makes maintenance difficult since the module is replaced each time rules are added, changed, etc. Also, it is not possible to add, delete, or change a rule after installation since this module is built in.

BRIEF SUMMARY OF THE INVENTION

The present invention provides a novel data processing apparatus, method, and storage medium that facilitates adding, deleting, and changing of modified rules easily, makes maintenance easy, and enables adding, deleting, and changing modified rules even after installation.

The present invention provides a data processing apparatus that receives job data output by an application executing unit after receiving printing instruction from an information processing apparatus and executes printing, and includes a virtual printer driver unit that extracts image data and job information data that includes identifying information to identify at least one of information processing apparatus and its user from job data and outputs the image data and job information data, a output destination determining unit that determines printing apparatus as output destination by referring to association table and using output identifying information or content of image data, a print instructing unit that generates output data using image data and job information data and sends output data to the determined printing apparatus, a output destination type determining unit, one or more modification processing unit, and a determining unit.

The output destination type determining unit determines which type the determined output destination corresponds to using registered categorizing information. The one or more modification processing unit executes modifying process different from each other on content of image data. The determining unit determines which modifying process to execute by referring to content of modifying process set for each categorized type. The content of the categorizing information and modifying process can be customized, and the modification processing unit can be added or deleted.

An administrator of the data processing apparatus can change the way how to categorize output destination by changing setting of categorizing information in response to requests from users, and can change the content of modifying process by changing setting. Also, the administrators can delete the unnecessary modification processing unit by changing setting, and can execute modifying process on the new modification processing unit by changing its setting in case the modification processing unit is newly added. Accordingly, an administrator can add modified rule, delete and change rule easily, and can add modified rule, delete and change rule even after the installation on the apparatus of this invention.

Each modification processing unit is generated by reading modules for modifying processes, and added/deleted by adding/deleting modules. The modules can be built separately from programs that implement each unit described above except the modification processing unit, and can be implemented as dynamic link library (DLL). That makes software maintenance easy.

The data processing apparatus can include a first generating unit that generates modification processing unit by reading module that executes the modifying process by referring to modifying process determined above. Alternatively, the data processing apparatus can include a second generating unit that generates modification processing unit for each module by reading all the modules, and can choose necessary modification processing unit among generated modification processing units and execute desired modifying process. It should be noted that it is more preferable to adopt the first generating unit that reads necessary modules only since that can constrain amount of memory usage and improve processing speed.

One modification processing unit determines whether or not predefined string exists in document as content of image data If the modification processing unit determines that the string exists, the modification processing unit executes modifying process that changes the whole document into unreadable. The modifying process can be the process to paint the whole document black. Accordingly, in case the document is printed out on a printing apparatus located in a room where a person with no duty to keep secret can browse by mistake, security can be ensured since the person can not read the document.

Another modification processing unit determines whether or not predefined string exists in document as content of image data. If the modification processing unit determines that the string exists, the modification processing unit executes marking process on the document. The marking process can be adding string such as "confidential." Accordingly, users can recognize that the document is confidential easily.

Another modification processing unit determines whether or not predefined string exists in document as content of image data. If the modification processing unit determines that the string exists, the modification processing unit adds user name as user identifying information extracted by the virtual driver unit. Accordingly, users can recognize who printed the document out easily, and that prevents other users from taking the document away.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a diagram illustrating another example of modifying process that the document modifying unit in FIG. 3 executes as an embodiment of the present invention.

FIG. 6A and FIG. 6B are flowcharts illustrating an example of a data process that the data processing apparatus in FIG. 2 executes as an embodiment of the present invention.

FIG. 10 is a diagram illustrating another example of modifying process that the document modifying unit in FIG. 8 executes as an embodiment of the present invention.

FIG. 11A and FIG. 11B are flowcharts illustrating a modifying process that the data processing apparatus with the document modifying unit in FIG. 8 executes as an embodiment of the present invention.

DETAILED DESCRIPTION OF THE PREFERRED EMBODIMENTS

Figure 1:
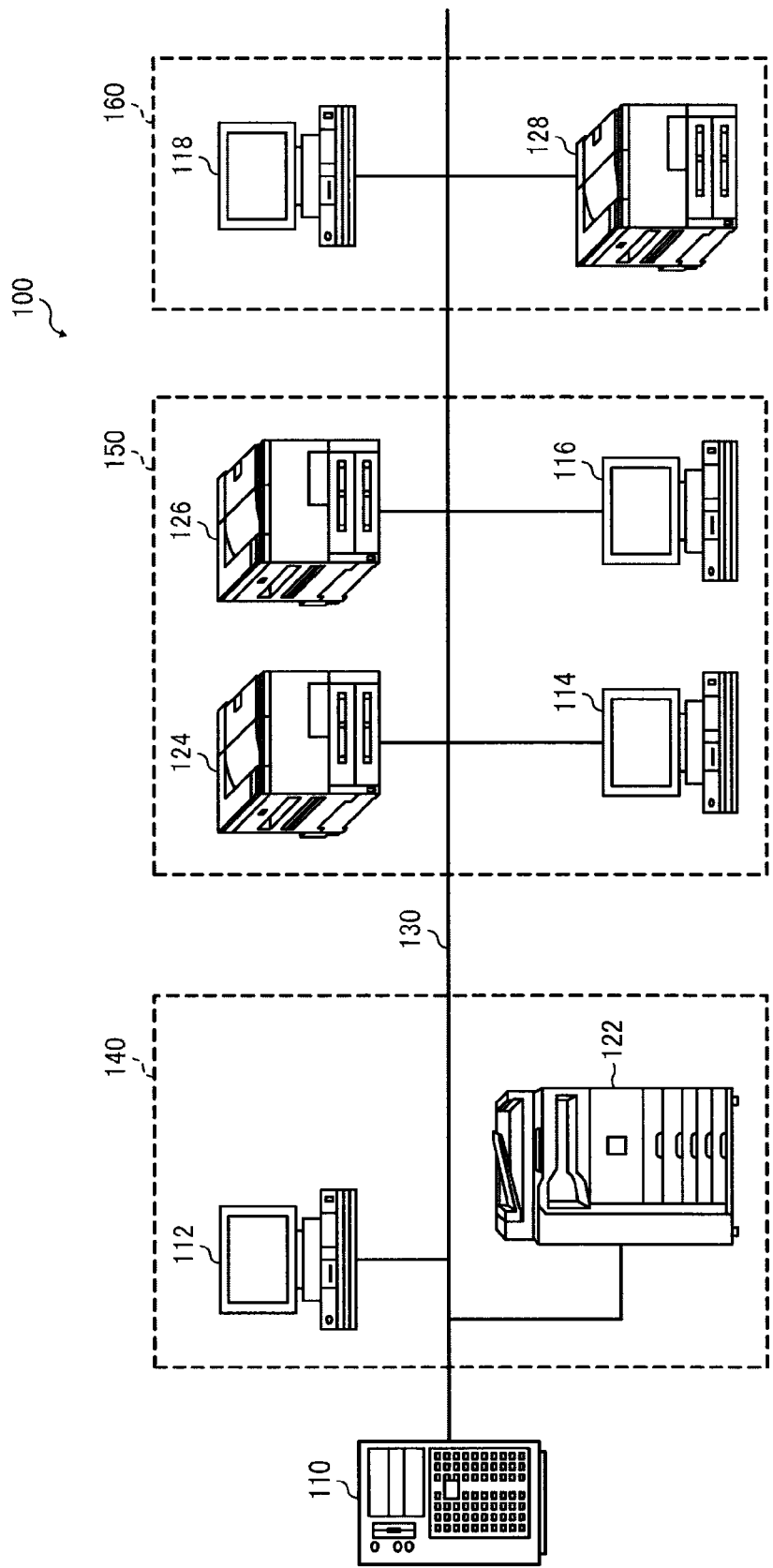
FIG. 1 is a diagram illustrating a printer network that includes a data processing apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings.

FIG. 1 is a diagram illustrating a printer network that includes a data processing system of this embodiment. A printer network 100 consists of a plurality of information processing apparatuses 112-118 located at places such as offices and connected to a network 130. Also a data processing apparatus 110, a printer server not shown in figures, and remote printers 122-128 such as MFPs, laser printers and inkjet printers are connected to the network 130.

A plurality of the information processing apparatuses 112-118 send printing requests and print data to the printer server and execute printing on one of the remote printers 122-128. In this embodiment, the data processing apparatus 110 acquires the printing requests and print data sent to the printer server.

The data processing apparatus 110 can execute transactions using an appropriate remote connecting protocol such as Remote Desktop Protocol (RDP) when it acquires printing requests and print data from the information processing apparatuses 112-118.

The data processing apparatus 110 acquires printing requests and print data from the information processing apparatuses 112-118, identifies remote printers 122-128 assigned to the information processing apparatus 112-118, and generates raw data corresponding to the print data for the assigned remote printers 122-128. This raw data becomes output data after adding PDL command etc., and is sent to the assigned remote printer via the printer server. Accordingly, the data processing apparatus 110 executes printing on appropriate remote printers 122-128 assigned to information processing apparatuses 112-118.

PCs, workstations, and mobile information devices such as smartphones are examples of information processing apparatuses 112-118 comprising the printer network. The information processing apparatuses 112-118 each have a single-core/multi-core CPU, include storage devices such as a RAM, ROM, and hard disk drive (HDD), and communications devices such as a network interface card (NIC), and request printing to remote printers 122-128 on an appropriate operating system (OS) such as Windows, UNIX, Linux, or Mac OS.

In this preferred embodiment, the data processing apparatus 110 and the printer server can be implemented as server apparatuses since they execute appropriate processes after receiving requests from the information processing apparatuses 112-118. Therefore, the information processing apparatuses 112-118 can be implemented as client apparatuses such as a fat client apparatus and a thin client apparatus. The fat client apparatus has installed application programs and completes various types of processes. The thin client apparatus just requests services to a network connecting module, user authenticating function, and session generating module etc., in the data processing apparatus 110, receives the processed result, and requests printing.

In case the information processing apparatuses 112-118 are implemented as fat client apparatuses, they read application programs and data from storage devices such as the HDD and store them to RAM. The CPU executes the application program to generate print data comprising document, image, and multimedia, and sends this print data to the data processing apparatus 110 with a printing request. Identifying the remote printer 122-128 and executing modifying processes described below on the data processing apparatus 110 follow.

In case the information processing apparatuses 112-118 are implemented as thin client apparatuses, they have the data processing apparatus 110 execute an application program installed in the data processing apparatus 110 and generate print data. After receiving notification that the process finished, they request printing to the data processing apparatus 110. Then the data processing apparatus 110 determines the remote printer and executes the modifying process described below.

Like the information processing apparatuses 112-118, the data processing apparatus 110 has installed a CPU, ROM, RAM, HDD, and NIC, controls output destination of print data, and executes a modifying process under control of appropriate OS. The printer server also has installed a CPU, ROM, RAM, HDD, and NIC, manages each remote printer, receives printing request from the data processing apparatus 110 based on printing request from the information processing apparatuses 112-118, sends print data to remote printer 122-128 determined as output destination, and has the remote printer execute a print job.

The printer server includes printer drivers corresponding to each remote printer 122-128. Receiving printing request from the data processing apparatus 110 and sending print data to remote printer 122-128 are controlled by printer driver corresponding to remote printer 122-128 determined as output destination. In this embodiment, the printer server is implemented as an independent apparatus. The printer server can also be implemented as a printer server application in the data processing apparatus 110.

Among remote printers 122-128, laser printer and inkjet printer include NIC, receive print data from the printer server via the network 130, and execute a print job. MFPs can be a remote printer connected to the network 130 via NIC. MFPs can also include function of printer server.

The network 130 can be Ethernet such as 100Base-TX and 1000Base-TX, optical network, and wireless network such as IEEE 802.11. The network 130 communicates bidirectionally using frame or packet transfer communication based on TCP/IP. The network 130 can be a wide area network (WAN) such as the internet in a secure environment operated by Virtual Private Network (VPN) technology other than LAN.

The remote printers 122-128 can be assigned to information processing apparatuses 112-118 using information specific to the information processing apparatuses 112-118. Examples of information specific to information processing apparatuses 112-118 are IP addresses, Media Access Control (MAC) addresses, and computer names assigned to each information processing apparatus 112-118. Also, user information such as login names that users enter when they use services can be used as information specific to the information processing apparatuses 112-118. Alternatively, user names and user codes to identify users read by an IC card reader installed separately can be used as user information.

Also remote printers 122-128 can be assigned specific content of a document to be printed. In case remote printers 122-128 are assigned a specific string, after examining which specific string is included in image data to be printed, the remote printer assigned to the string is selected and the print job is executed on the remote printer.

Appropriate database that an administrator of the data processing apparatus 110 entered can be used as an association table for the assigning process described above. For example, IP addresses of information processing apparatuses 112-118 can be associated with printer name of remote printer 122-128, and that information can be registered to the association table.

In FIG. 1, an information processing apparatus 112 and a remote printer 122 are located at location 140 enclosed by the broken line, information processing apparatuses 114 and 116 and remote printers 124 and 126 are located at location 150 enclosed by the broken line, and an information processing apparatus 118 and a remote printer 128 are located at location 160 enclosed by the broken line. Therefore, remote printer 122-128 can be assigned to not only each information processing apparatus but also group of information processing apparatuses or user group. In this case, group IDs to identify groups can be associated with printer names of remote printer 122-128, and that information can be registered to the association table described above.

Figure 2:
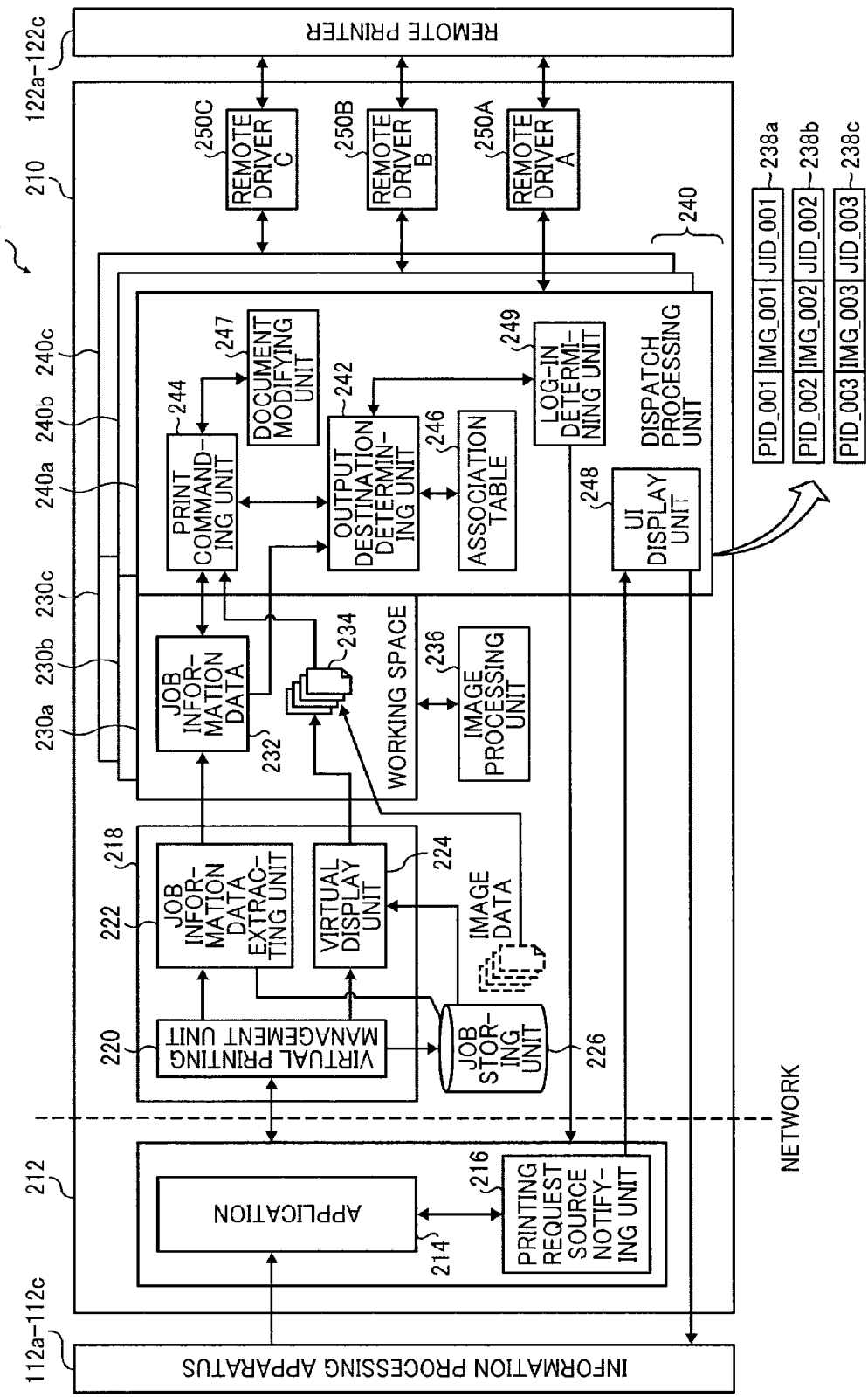
FIG. 2 is a diagram illustrating functional blocks of the data processing apparatus as an embodiment of the present invention.

FIG. 2 is a diagram illustrating functional blocks of the data processing apparatus as an embodiment of the present invention. The data processing apparatus 110 includes a plurality of functional units as shown in FIG. 2. These functional units are implemented on a computer by reading programs from the computer's RAM and executing those programs with its CPU.

The data processing apparatus 110 is connected to information processing apparatuses 112a-112c and remote printers 122a-122c as shown in FIG. 2 so that the data processing apparatus 110 receives processing request and executes processing, receives printing request, selects appropriate remote printer, and has the remote printer print.

The data processing apparatus 110 includes a data processing unit 210 and an application executing unit 212. Those units are implemented as one unit as shown in FIG. 2. Alternatively, considering the broken line as the network boundary, the application executing unit 212 can be implemented on a terminal server set up separately, and the data processing unit 210 alone can be implemented as the data processing apparatus 110.

The application executing unit 212 includes an application 214 and a printing request source notifying unit 216. The application executing unit 212 receives processing requests and printing requests from the information processing apparatuses 112a-112c via the network 130, execute those processes, and generate execution results. After calling Application Programming Interface (API) such as Graphical Device Interface (GDI), this execution results become job data of a print job in response to print commanding event generated by the application 214. Accordingly, this job data is sent to the data processing unit 210.

The application 214 is implemented as a print commanding module. After receiving printing request from the information processing apparatuses 112a-112c, the application 214 notifies the data processing unit 210 that new job has started.

The printing request source notifying unit 216 receives information to identify printing request source (printing request source identifying information) from the information processing apparatuses 112a-112c and sends this printing request source identifying information and process ID to identify the started job to a dispatch processing unit 240 in the data processing unit 210. Accordingly, the dispatch processing unit 240 can have the same level of authority as application of printing request source, and display information to identify remote printer as destination of print data and printing information such as number of printing pages to the printing request source.

The data processing unit 210 includes a virtual printer driver 218, a job storing unit 226, and the dispatch processing unit 240.

The virtual printer driver 218 is activated after being called from the application 214 in the application executing unit 212, and starts processing after receiving job data from the application 214. The virtual printer driver 218 generates the process ID described above, sends the process ID to the printing request source notifying unit 216 in the application executing unit 212, and has the printing request source notifying unit 216 notify the dispatch processing unit 240 of the process ID and printing request source identifying information.

Job data includes printing request, image data obtained from print data, and job information data. Image data can include image format data such as bitmap, Joint Photographic Experts Group (JPEG), Graphics Interchange Format (GIF), Enhanced MetaFile (EMF) that includes drawing codes, Postscript, Portable Document Format (PDF), and XML Paper Specification (XPS). Job information data includes identifying information such as IP address and login name described above to identify information processing apparatuses 112a-112c and user who utilizes the information processing apparatus 112a-112c as information to identify the printing request source. Job information data also includes information such as imposing information of image data, print setting information such as margin, size setting, number of pages and color/monochrome, and document name.

The virtual printer driver 218 includes a virtual printing management unit 220, a job information data extracting unit 222, and a virtual drawing unit 224. After receiving job data from the application 214, the virtual printer driver 218 calls the virtual printing management unit 220. The virtual printing management unit 220 calls the job information data extracting unit 222 and has the job information data extracting unit 222 separate job information data from the image data. Then the job information data extracting unit 222 stores image data in the job storing unit 226, associates the job information data with process ID and stores them in temporary storing apparatus such as RAM or register, or nonvolatile storing apparatus such as HDD, EPROM and EEPROM.

Also the virtual printing management unit 220 calls the virtual drawing unit 224 and has the virtual drawing unit 224 keep a working space 230a-230c as memory space to process associating image data with job. The working space 230a-230c is formed by allocating appropriate amount of memory space in RAM that the data processing unit 210 manages, and can be referred as virtual spooler etc.

The job information data extracting unit 222 extracts job information data from job data stored in the job storing unit 226 temporarily, and passes the job information data to a relating print commanding unit 244 among private instances 240a-240c in a dispatch processing unit 240.

The virtual drawing unit 224 moves image data stored in the job storing unit 226 to working space 230a-230c, empties the job storing unit 226, notifies the application executing unit 212 that the image processing finished. When the application 214 receives that notification from the virtual drawing unit 224, the application 214 releases exclusive management on the job storing unit 226, and following printing requests can be processed. Exclusive management can be implemented using technologies such as semaphore and synchronizing class. Alternatively, simplified exclusive management can be implemented changing Graphical User Interface (GUI) that the application 214 in the application executing unit 212 presents into the way not receiving events.

In FIG. 2, the job information data extracting unit 222 in the virtual printer driver 218 is illustrated as one functional processing unit. Alternatively, by implementing a plurality of the job information data extracting unit 222, a plurality of job information data extracting units can run in parallel and process large job data that includes many pages and large image data effectively. In this case, each job information data extracting unit stores image data in the job storing unit 226 sequentially using exclusive management.

The job storing unit 226 can be implemented as memory area storing printer buffer and spool file. When the virtual drawing unit 224 moves the image data 234 to the working space 230a, the image data 234 is sent to the image processing unit 236. The image processing unit 236 acquires image data generated for each job in the working space 230a and the job information data 232 extracted by the job information data extracting unit 222 in the working space 230a, and executes processes such as layout and imposing pages.

After receiving job data from the application executing unit 212, the virtual printer driver 218 generates private instances 240a-240c in the dispatch processing unit 240 for the job and has each private instance execute process to determine output destination. The private instances 240a-240c activated for each job call remote driver corresponding to remote printer 122-128 determined as output destination, create RAW format specific to remote printer 122a-122c using imposing and print setting information included in image data and job information data received from the working space 230a-230c, and send output data in RAW format.

The image processing unit 236 can be implemented as a drawing processing module that includes remote drivers 250A-250C and a drawing processor. The image processing unit 236 can execute process in case image data is in image format such as EMF that includes drawing codes, PDF, Postscript, and XPS. Also the image processing unit 236 can convert image calling remote driver, repeat processing with the working space 230a-230c until remote driver 250A-250C finishes creating raster image, and generate output data in RAW format.

The private instances 240a-240c associate the job information data 232 that the job information data extracting unit 222 extracted with process ID and image data, generate as a job managing list 238a-238c. That job managing list can be used to manage each private instance.

The private instances 240a-240c are implemented as the dispatch processing unit 240 and include an output destination determining unit 242, a print commanding unit 244, an association table 246, a document modifying unit 247, a User Interface (UI) displaying unit 248, and a login determining unit 249. After receiving job information data from the job information data extracting unit 222, the dispatch processing unit 240 asks the print commanding unit 244 to execute the printing process.

After receiving the request from the dispatch processing unit 240, the print commanding unit 244 asks the output destination determining unit 242 to determine output destination. The output destination determining unit 242 acquires information on output destination associated with printing request source and content of document from the job information data 232 and image data extracted from job data by the job information data extracting unit 222 and determines output destination by referring to the association table 246. Alternatively, the output destination determining unit 242 acquires login name that the login determining unit received and utilized for authenticating, gets output destination information associated with the login name, and determines output destination by referring to the association table 246. The output destination determining unit 242 sends the determined output destination information and the process ID to the print commanding unit 244.

The association table 246 uses IP address that information processing apparatus inputs as one of identifying information to identify printing request source and associates the IP address with printer name as information to identify remote printer of output destination. Alternatively, the association table 246 associates printer names with MAC addresses, login names and content of documents other than IP addresses.

The output destination determining unit 242 uses information such as IP address of printing request source, login name, and content of document to determine output destination. In some cases, output destinations associated with each of those pieces of information can be different from each other. In that case, the output destination determining unit 242 can use predefined information on priority and adopts the highest prioritized information to determine output destination. If prioritized order is IP address, login name, and content of document, the output destination determining unit 242 can acquire printer name corresponding to the highest prioritized IP address, and determine remote printer as output destination using the printer name. The process described above is just an example and not limited to that.

The print commanding unit 244 calls remote driver corresponding to remote printer as output destination by referring to received information on output destination and generates output data. After sending the output data to remote printer, the print commanding unit 244 sends process ID, information on output destination, and a command to display printing information to the UI displaying unit 248.

The print commanding unit 244 changes output destination based on received information on output destination in response to information processing apparatus and user as printing request source. The output destination determining unit 242 determines output destination based on information on print setting and job information included in job information data by referring to data table that registers information on performance of printers such as printing speed. The print commanding unit 244 can change output destination for output data based on information on the determined output destination.

After receiving information on output destination, process ID, and job information data from the output destination determining unit 242, the print commanding unit 244 registers newly the received process ID with output destination managing table, acquires printing information from job information data, and sets output destination information and printing information to a record corresponding to the process ID. It should be noted that user information that identifies user who issued the print job, IP address that identifies information processing apparatus that the user uses, apparatus information such as MAC address and computer name, print setting information such as color, monochrome, grayscale, duplex printing, simplex printing, page layout, job information such as document name, number of pages, and output content can be used as printing information.

After generating output destination managing table, the print commanding unit 244 sends it to a dispatch processing unit such as a port monitor, and remote printer 122a-122c as output destination designated by the process ID can print accordingly.

Before executing printing on a remote printer, the print commanding unit 244 requests the document modifying unit 247 to do modification and sends information on output destination. Subsequently, the print commanding unit 244 calls remote driver corresponding to the determined output destination as described above, generates RAW data from image data modified by the document modifying unit 247, and generates output data adding PDL commands. The output data is sent to the printer server via the dispatch processing unit described above. The printer server sends the output data to remote printer associated with the received output data and has the remote printer execute the print job.

After receiving request on modification from the print commanding unit 244, the document modifying unit 247 modifies image data that being processed image conversion on the working space 230a-230c in response to output destination in received output destination information. The configuration and content of processing of the document modifying unit 247 will be described later.

In case of having features such as page layout and imposing, the remote driver 250A-250C converts job information data designated as feature setting parameter and generates RAW data. If Windows is used as OS, intended RAW data can be generated by setting job information data to print setting structure DEV MODE, since most printer drivers on Windows can receive EMF and converting data is not necessary if image data is in EMF format. Alternatively, in case of not having features such as page layout and imposing, the remote driver 250A-250C can generate intended RAW data by splitting EMF into each page, shuffling page order, and designating drawing position.

The UI displaying unit 248 notifies information processing apparatus as printing request source for each job of information on output destination and printing information. After receiving information on printing request source and process ID from the printing request source notifying unit 216 in the application executing unit 212, the UI displaying unit 248 registers information on printing request source and process ID with the displaying destination managing table. Information on printing request source is associated with process ID and registered in the displaying destination managing table.

Also, after receiving information on output destination and displaying request for printing information along with process ID from the print commanding unit 244, the UI displaying unit 248 refers to the output destination managing table, acquires information on output destination and printing information associated with the process ID, sends that information to the information processing apparatus as the printing request source, and has that information display on the information processing apparatus. Accordingly, the user can know the dispatch destination that the dispatch processing unit 240 determined automatically and printing information.

Furthermore, the UI displaying unit 248 can display printing information dialog as UI that displays printing information on the information processing apparatus associated with the process ID, and wait for direction to continue printing or cancel printing from the information processing apparatus. Also, the UI displaying unit 248 can display print canceling dialog that notifies that printing has been canceled.

Examples of printing information dialogs are a dialog to notify a user that a print job to be executed is color printing and prompt the user to change to monochrome printing, a dialog to prompt a user to choose a high-speed printer because of lots of pages, and a dialog to prompt a user to use duplex printing or change page layout.

The application executing unit 212 requests the information processing apparatus that a user uses to input login name and password when the user utilizes the application 214. The login determining unit 249 checks whether or not the input login name and password exist in the registered user information and executes authorizing. The login determining unit 249 stores preregistered and associated login names and passwords. If the input login name and password match, the login determining unit 249 notifies the application executing unit 212 that the authorization succeeded, and allows the application executing unit 212 to utilize the application 214. If not, the login determining unit 249 notifies the application executing unit 212 that the authorization failed, and has the application executing unit 212 notify the information processing apparatus that the login process failed.

The output destination determining unit 242 needs user information such as login name entered at user's login time to determine output destination in compliance with user information, so the login determining unit 249 receives request for user information from the output destination determining unit 242 and send the user information to the output destination determining unit 242.

Figure 3:
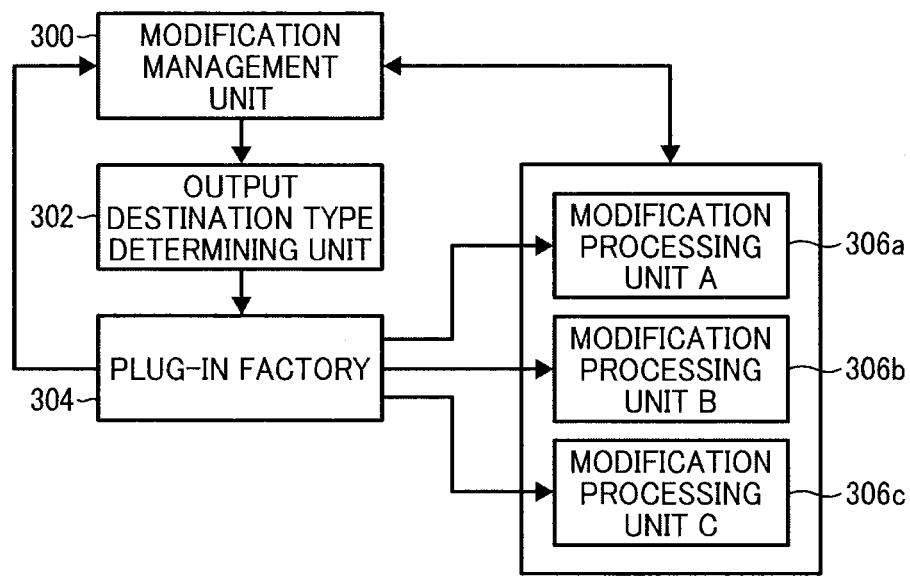
FIG. 3 is a diagram illustrating an example of document modifying unit in the data processing apparatus as an embodiment of the present invention.

Detailed configuration of the data processing apparatus and processes that each functional unit executes has been described with reference to FIG. 2. Next, detailed configuration of the document modifying unit 247 and processes that the document modifying unit 247 executes will be described in detail below referring to FIG. 3-6. FIG. 3 illustrates an example of configuration of the document modifying unit.

The document modifying unit 247 executes modifying suited for output destination determined by the output destination determining unit 242 on converted image data in the working space 230a-230c. To carry out this process, the document modifying unit 247 includes a modification managing unit 300, an output destination type determining unit 302, a Plug-in Factory 304, and one or more modification processing unit 306a-306c The modification managing unit 300 receives request for modifying process and information on output destination, and requests the modification processing unit 306a-306c to modify image data. After receiving information on output destination from the modification managing unit 300, the output destination type determining unit 302 determines which type the determined output destination corresponds to by referring to categorizing information of types predefined by an administrator of the data processing apparatus 110. Output destination can be categorized by its security level. For example, output destination can be categorized into "High security level" and "Low security level," and that information can be adopted as types.

These types can be registered as text data and eXtensible Markup Language (XML) data written in string such as "High security level" and "Low security level" in response to requests from users. The storage apparatus such as HDD stores this data, and the output destination determining unit 242 reads that data and determines which category output destination corresponds to based on location of remote printer as output destination.

For example, text data etc. includes information on locations corresponding to "High security level" and "Low security level," and the output destination type determining unit 302 stores information on location for each of remote printer. From this information and output destination information, which type the location is categorized can be determined.

The Plug-in Factory 304 determines which modifying process should be executed by referring to content of modifying process set for each categorized type and type information determined by the output destination type determining unit 302. The Plug-in Factory 304 also loads a module that executes the determined modifying process and generates modification processing unit 306a-306c. Text data etc. described above can include furthermore information to identify modules such as content of modifying process for each type and module names. Therefore, the Plug-in Factory 304 can specify modifying process based on this information and load module to execute the modifying process. In this embodiment, categorizing information and content of modifying process etc. are written in the same text data etc., but they can be written in separate text data etc.

For example, if type is determined as "High security level," the Plug-in Factory 304 loads one module and generates the modification processing unit 306a only. Alternatively, if type is determined as "Low security level," the Plug-in Factory 304 loads three modules and generates the modification processing units 306a, 306b, and 306c. In case of "High security level," after generating the modification processing unit 306a, the modifying management unit 300 requests the modification processing unit 306a to execute modifying process. In case of "Low security level," after generating the modification processing units 306a-306c, the modifying management unit 300 requests the modification processing units 306a-306c to execute modifying process sequentially.

Administrators of the data processing apparatus 110 can change easily the way how output destination is categorized by changing setting of categorizing information in response to request from users. Also Administrators of the data processing apparatus 110 can change easily content of modifying process by changing setting. Administrators can also delete modification processing unit no longer required due to the change of setting. If a new modification processing unit is added, administrators can also have the new modification processing unit execute modifying process by changing its setting. Accordingly, modifying rules can be added, deleted, and modified easily, and even after installation, modifying rules can be added, deleted, modified.

The modification processing units 306a-306c are generated by loading modules that execute various modifying processes on the CPU, and modification processing units can be added/deleted by adding/deleting modules. Those modules can be created separately from programs implementing units other than modification processing units, and implemented in plug-in format such as Dynamic Link Library (DLL.) This makes adding, deleting, modifying, and maintaining those modules easy.

Figure 4:
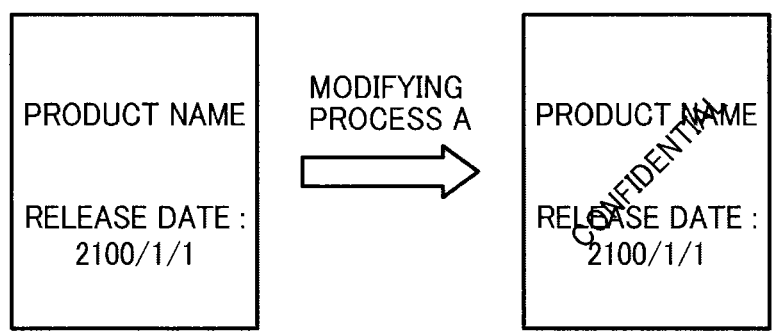
FIG. 4 is a diagram illustrating an example of modifying process that the document modifying unit in FIG. 3 executes as an embodiment of the present invention.

FIG. 4 illustrates an example of a document modifying process. In this case, categorized type is "High security level," and name of unannounced product and its release date is included in the document as confidential information. Since the type of output destination is "High security level," the Plug-in Factory 304 specifies the modifying process to be executed by referring to content of modifying process set for each type.

In this case, the process adding string "confidential" to the document is specified. Since content of modifying process is associated with the name of module that executes the modifying process, only the modification processing unit 306a is generated by loading the module. In FIG. 4, only the modification processing unit 306a executes modifying process on the document and adds string "confidential" at a slant on the document.

FIG. 5 illustrates another example of a document modifying process. In this case, categorized type is "Low security level," and name of unannounced product and its release date is included in the document as confidential information. Since the type of output destination is "Low security level," the Plug-in Factory 304 specifies the modifying process to be executed by referring to content of modifying process set for each type. Since the type is different from the example described above, a different modifying process from the example described above is specified.

In this case, two more processes of painting the product name black and painting the release date black are specified in addition to process of adding string "confidential" to the document described above. Therefore, three modules that execute these processes are loaded and three modification processing units 306a-306c are generated for each module.

In FIG. 5, the modification processing units 306a-306c execute modifying processes sequentially. First, the modification processing unit 306a adds string "confidential." Second, the modification processing unit 306b paints the unannounced product name black in the document. Lastly, the modification processing unit 306c paints the release date black in the document. In case of printing a document with a plurality of pages and these three modification processing units 306a-306c are generated, the modification processing units 306b and 306c determine whether or not the specific string predefined by administrators such as product name and release date is included in each page, and execute modifying process if the string is included, and do not execute modifying process if the string is not included.

Accordingly, in case the document is printed by a remote printer located at places where outsiders can browse printouts and categorized as low security level, the document is modified so that confidential information is hidden, that can omit revealing confidential information surely even if the printing is executed by mistake.

Figure 6B:
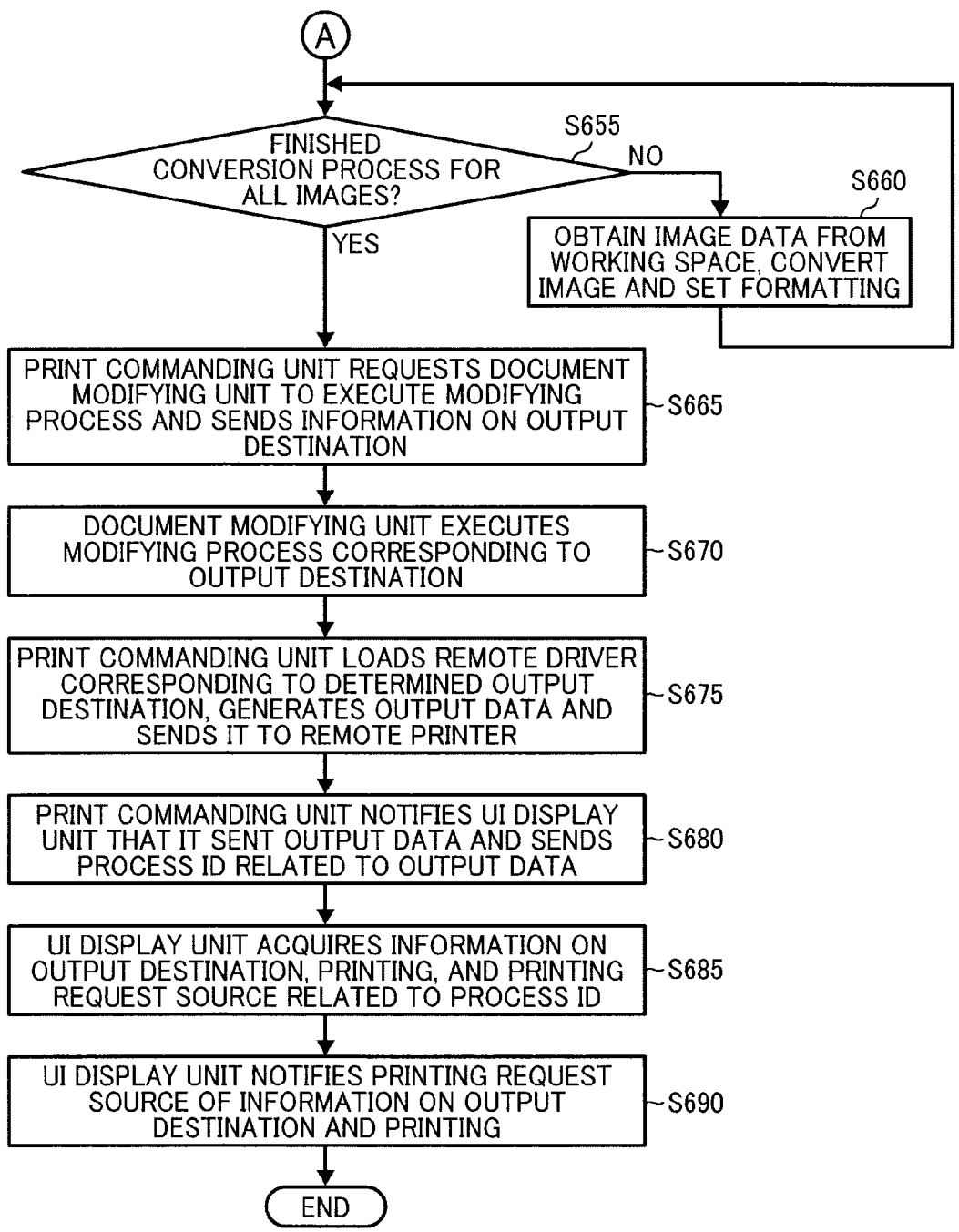

Processes executed by the data processing apparatus will be described below in detail with reference to FIG. 6A and FIG. 6B. The application executing unit 212 chooses the virtual printer driver 218, and various settings are registered in S605. Administrators of the data processing apparatus 110 can do this registration using dedicated GUI. The application 214 sends job data to the virtual printer driver 218 in response to requests from the information processing apparatus 112a-112c in S610.

In S615, after receiving job data, the virtual printer driver 218 generates process ID and private instances 240a-240c in the dispatch processing unit 240 for the job, and registers the process ID with field in the job management list 238a-238c. Process ID consists of string, number, and combination of string and number to identify a job that has started. In S620, the virtual printer driver 218 sends the process ID to the print request source notifying unit 216 in the application executing unit 212, and notifies the UI displaying unit 248 of information on printing request source.

In S625, the job information data extracting unit 222 separates the job information data 232 and the image data 234 from job data, generates job information ID and image ID, and registers the job information ID and the image ID with the job managing list 238a. In S630, the job information data extracting unit 222 sends the image data 234 to the job storing unit 226, and sends the job information data to the dispatch processing unit 240 of the corresponding private instance.

In S635, the print commanding unit 244 in the dispatch processing unit 240 requests the output destination determining unit 242 to determine output destination. In S640, the output destination determining unit 242 determines output destination from the job information data by referring to the association table 246, and sends the information on output destination to print commanding unit 244.

In S645, the virtual displaying unit 224 generates the working space 230a-230c allocating memory space, moves the image data 234 from the job storing unit 226 to the working space 230a-230c, and calls the image processing unit 236. In S650, the image processing unit 236 executes image converting process using the job information data 232. It should be noted that this image converting process includes imposing images, changing printing size, margin, converting bitmap data without drawing codes into EMF and so on that includes drawing codes. Processes in S635 and S640 and processes in S645 and S650 can be processed in parallel. Also processes in S645 and S650 can be processed firstly, and then processes in S635 and S640 can be processed subsequently.

In S655, whether image converting process by the image processing unit 236 has finished or not is determined If not, the process proceeds to S660. In S660, process will repeat until image conversion and format setting are finished for all images under processing in the working space 230a-230c.

After finishing image converting processes for all images, the print commanding unit 244 specifies remote driver corresponding to the output destination allocated to the process ID by referring to dispatch managing table. In S665, before calling remote driver, the print commanding unit 244 requests the document modifying unit 247 to process modifying and sends information on output destination determined by the output destination determining unit 242 to the document modifying unit 247.

In S670, the document modifying unit 247 executes modifying process in compliance with output destination. After finishing this modifying process, the document modifying unit 247 sends notification to the print commanding unit 244. In S675, the print commanding unit 244 calls remote driver corresponding to the output destination, generates RAW data from modified image data, generates output data adding PDL commands and so on to the RAW data, and sends the output data to the remote printer as the output destination.

In S680, the print commanding unit 244 notifies the UI displaying unit 248 that the print commanding unit 244 sent the output data to the remote printer, and sends the process ID corresponding to the output data to the UI displaying unit 248. In S685, the UI displaying unit 248 acquires information on output destination and printing related to the received process ID by referring to the dispatch managing table, and also acquires information on printing request source related to the received process ID by referring to the display destination managing table. In S690, the UI displaying unit 248 notifies the information processing apparatus as the printing request source of information on output destination and printing.

Figure 7:
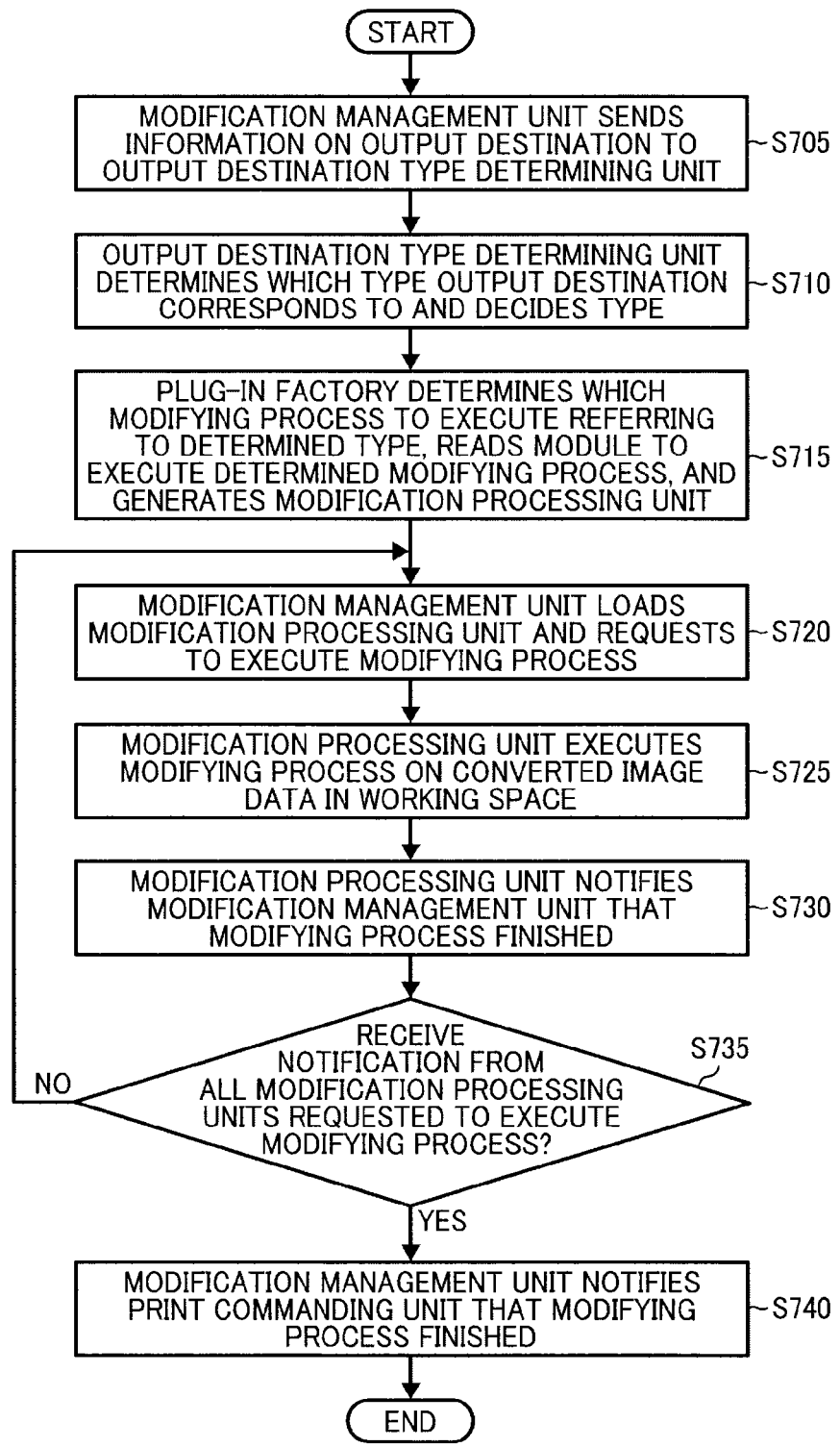
FIG. 7 is a flowchart illustrating an example of a modifying process that the document modifying unit in FIG. 3 executes as an embodiment of the present invention.

Modifying processes executed by the document modifying unit 247 in FIG. 3 will be described in detail with reference to FIG. 7. This modifying process starts in response to the print commanding unit 244 requests the document modifying unit 247 to execute modifying process and the document modifying unit 247 received information on output destination in S670 in FIG. 6B. In S705, the modifying management unit 300 sends the received information on output destination to the output destination type determining unit 302.

In S710, after receiving information on output destination from the modifying management unit 300, the output destination type determining unit 302 determines which type in categorizing information that administrators set the output destination included in the information on output destination corresponds to, and decides the type of output destination. Example of categorizing information is information such as "High security level" and "Low security level" that includes type as described above, and the output destination type determining unit 302 decides type by determining which type the output destination corresponds to. In this case, the output destination type determining unit 302 specifies environment of output destination by referring to predefined information on printer location associating environment at location of remote printer with security level, decides its security level, and determines corresponding type. This information on environment at printer location is also included in text data etc. as described above.

Each remote printer can hold information on security levels of the remote printer as printer information. In this case, the data processing apparatus 110 can acquire this information on security level acquiring Management Information Base (MIB) information that remote printer manages using Simple Network Management Protocol (SNMP.)

After determining type, the output destination type determining unit 302 notifies the Plug-in Factory 304 of the type. In S715, the Plug-in Factory 304 determines which modifying process to execute by referring to the type. Next, the Plug-in Factory 304 reads module that executes the determined modifying process, and generates the modification processing units 306a-306c that execute the determined modifying process. The Plug-in Factory 304 specifies modifying process by referring to the received type and content of modifying process that corresponds to each type set by administrators. Module information such as module name to identify the module that executes the modifying process is included in the content of the modifying process. The Plug-in Factory 304 can read the module by referring to the module information. This module information can also be included in text data etc. as described above.

This modifying process can be implemented using application. Each module is provided in plug-in format, and stored in storage area such as predefined folders. Accordingly, the Plug-in Factory 304 can search for module that executes specified modifying process among modules stored in storage area, loads the module, replaces a part of program with the module, and execute the specified modifying process.

After generating the modification processing units 306a-306c, the Plug-in Factory 304 notifies the modifying management unit 300 of information on the generated modification processing units 306a-306c to. The modifying management unit 300 calls the generated modification processing units 306a-306c sequentially and executes the modifying processes sequentially using the information in response to the notification in S720. In S725, the modification processing unit executes the modifying process on image data processed image converting in working space. The modifying process modifies content of the image data as shown in FIG. 4 and FIG. 5. For example, the modification can be processes such as adding specified string to document to be printed, adding watermark, adding user name, painting confidential information part black and so on.

In S730, after finishing modifying process, the modification processing unit notifies the modification management unit 300 that it finished the modifying process. In S735, the modification management unit 300 determines whether or not it receives notification from all the modification processing units. If there is still modification processing unit to execute modifying process remaining, the modification management unit 300 goes back to S720 and requests next modification processing unit to execute modifying process.

If the modification management unit 300 receives the notification from all the modification processing units in S735, the modification management unit 300 proceeds to S740, notifies the print commanding unit 244 that the modifying process has finished, and finishes this modifying process.

Figure 8:
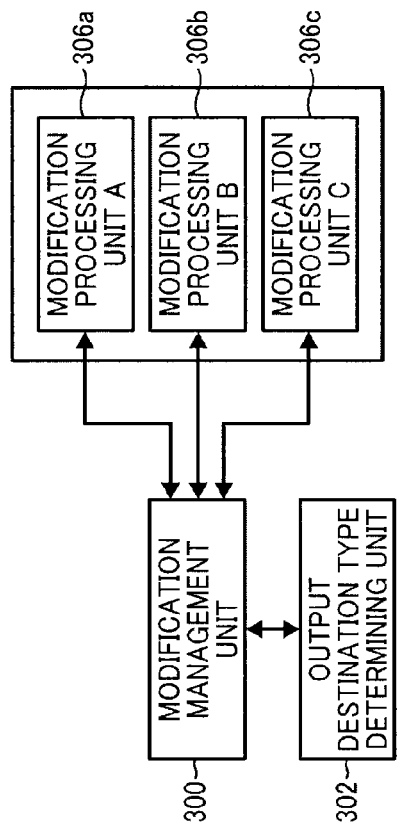
FIG. 8 is a diagram illustrating another example of the document modifying unit in the data processing apparatus as an embodiment of the present invention.

FIG. 8 illustrates another example of configuration of the document modifying unit 247. While the Plug-in Factory 304 is included in the embodiment in FIG. 3, the Plug-in Factory 304 is not included in the embodiment in FIG. 8. Therefore, in this embodiment, the modification management unit 300 can access to all the modification processing units 306a-306c and calls all the modification processing units 306a-306c.

After receiving modifying request from the print commanding unit 244, the document modifying unit 247 receives information on output destination determined by the output destination determining unit 242. The modification management unit 300 in the document modifying unit 247 reads all the modules from the storage area storing all the modules to generate the modification processing units 306a-306c. Since the document modifying unit 247 reads all the modules, a new modifying process can be added just by creating module that executes the new modifying process and storing the module into the storage area. In this embodiment, the modification management unit 300 generates a modification processing unit.

After reading all the modules and generating all the modification processing units 306a-306c (or before generating all the modification processing units 306a-306c,) the modification management unit 300 sends the received information on output destination to the output destination type determining unit 302. The output destination type determining unit 302 determines which type the received information on output destination corresponds to and decides type as described above.

The output destination type determining unit 302 notifies the modification management unit 300 of the determined type. The modification management unit 300 requests the modification processing units 306a-306c to execute modifying processes sequentially and sends information on the determined type. Each modification processing unit 306a-306c determines whether or not it executes the modifying process in response to the received type. Therefore, in this embodiment, each modification processing unit 306a-306c acts as a determining unit.

When the modification processing units 306a-306c execute the determining process described above, the modification management unit 300 tells the modification processing units to refer to content of modifying process corresponding to each type set by administrators. Thereby, the modification processing units 306a-306c specify content of modifying process by type and compare the content with content of modifying process that the modification processing unit executes itself. If they match, the modification processing unit determines to execute the modifying process, and if not, the modification processing unit determines not to execute the modifying process. It should be noted that the modification processing unit executes modifying process on image data processed image converting in the working space 230.

The modification management unit 300 requests to each modification processing unit, and receives notification from each modification processing unit on either it finishes modifying process or it does not execute modifying process. After receiving notification from all the modification processing units, the modification management unit 300 notifies the print commanding unit 244 that the modifying process has been finished.

Figure 9:
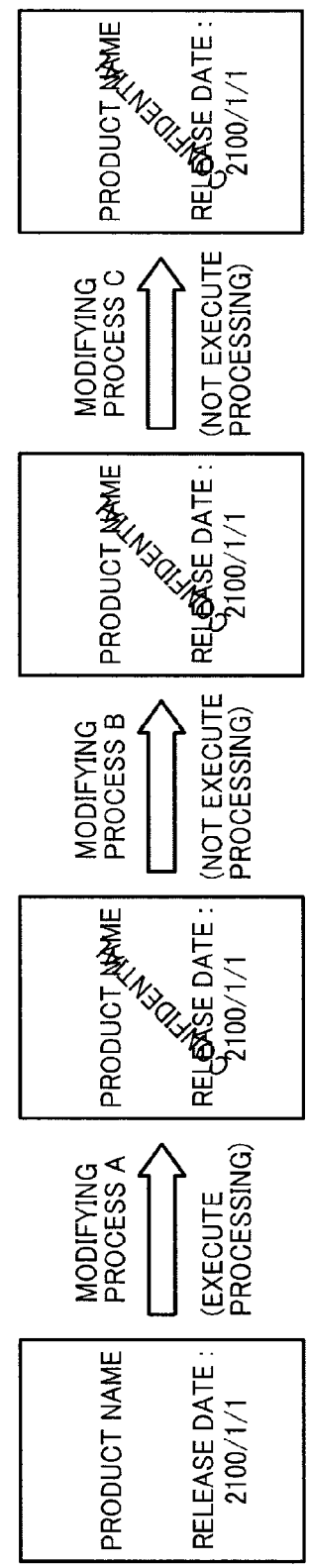
FIG. 9 is a diagram illustrating an example of modifying process that the document modifying unit in FIG. 8 executes as an embodiment of the present invention.

An example of document modifying process in this embodiment will be described below with reference to FIG. 9. In this example, the categorized type is "High security level," and unannounced product name and release date are included in the document as confidential information. In this embodiment, the modification management unit 300 reads all modules that execute modifying process and generates all the modification processing units 306a-306c.

The modification management unit 300 requests the modification processing units 306a-306c to execute modifying processes. After receiving the requests, the modification processing units 306a-306c decide that only the modification processing unit 306a executes modifying process and other modification processing units do not execute modifying processes by referring to the determined type. Consequently, after the modification processing unit 306a processes adding string "confidential," the modification processing units 306b and 306c process nothing. Therefore, only the modification processing unit 306a executes the modifying process on the document and adds the string "confidential" at a slant on the document in FIG. 9.

FIG. 10 illustrates another example of document modifying process in this embodiment. In this example, the categorized type is "Low security level," and unannounced product name and release date are included in the document as confidential information. Also in this embodiment, the modification management unit 300 reads all modules that execute modifying processes and generate all the modification processing units 306a-306c.

The modification management unit 300 requests the modification processing units 306a-306c to execute modifying processes. After receiving the requests, the modification processing units 306a-306c decide that all the modification processing unit 306a-306c execute modifying process by referring to the determined type.

In FIG. 10, the modification processing units 306a-306c execute modifying processes sequentially. First, the modification processing unit 306a executes process adding string "confidential." Next, the modification processing unit 306b executes process painting the unannounced product name in the document black. Lastly, the modification processing unit 306c executes process painting the release data in the document black. Thereby, revealing confidential information can be surely prevented. Also same as the embodiment in FIG. 5, in case of printing a document with a plurality of pages, the modification processing units 306b and 306c determine whether or not the specific string predefined by administrators such as product name and release date is included in each page, and execute modifying processes if the string is included, and do not execute modifying process if the string is not included. Therefore, the modification processing unit 306b does not execute process painting black on pages that do not include unannounced product name.

Figure 11B:
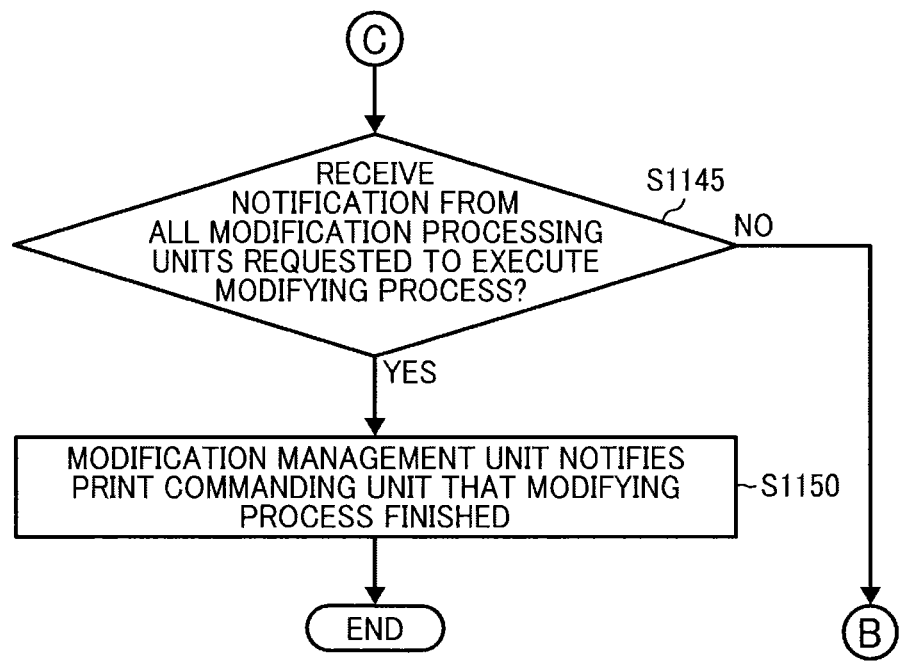

Next, modifying process that the document modifying unit 247 in FIG. 8 executes will be described below in detail referring to FIG. 11A and FIG. 11B. In response to the document modifying unit 247's receiving request for modifying process and information on output destination from the print commanding unit 244 in S670 in FIG. 6B, the document modifying unit 247 starts modifying process in FIG. 11A. The modification management unit 300 reads all the modules that execute modifying processes and generates the modification processing unit for each module in S1105.

The modification management unit 300 holds address of storage area such as folder that stores all the modules and can read all the modules by accessing to that address.

Next, the modification management unit 300 sends information on output destination received from the print commanding unit 244 to the output destination type determining unit 302 in S1110. The order of S1105 and S1110 described above can be in reverse. Alternatively, both steps can run concurrently.

After receiving information on output destination from the modification management unit 300, the output destination type determining unit 302 determines which type the output destination corresponds to in categorizing information set by administrators and decides type in S1115. Categorizing information and the way how to determine the type are the same as described above.

After determining type, the output destination type determining unit 302 notifies the modification management unit 300 of the type. The modification management unit 300 requests the generated modification processing units 306a-306c to execute modifying processes sequentially and sends information on the determined type in S1120. After receiving that information, the modification processing unit determines whether or not it executes modifying process corresponding to the determined type.

The modification processing unit specifies modifying process by referring to content of modifying process corresponding to each type set by administrators. The modification processing unit determines whether or not it executes modifying process by comparing content of specified modifying process with content of modifying process executed by the modification processing unit itself and determining whether they match or not.

If the modification processing unit determines to execute modifying process, it proceeds to S 1130 and execute modifying process on image data processed image converting in working space. After finishing the modifying process, the modification processing unit notifies the modification management unit 300 that the modifying process has been finished. Alternatively, if the modification processing unit determines not to execute modifying process, it proceeds to S1140 and notifies the modification management unit 300 that it does not execute modifying process.

The modification management unit 300 determines whether or not it receives the notification from all the modification processing units. If not, the modification management unit 300 goes back to S1120 and request the next modification processing unit to execute modifying process and sends information on the determined type. If so, the modification management unit 300 proceeds to S1150, notifies the print commanding unit 244 that the modifying process has been finished, and finishes this modifying process.

As described above, according to the invention, in the current network printing environment that information processing apparatuses such as PCs can access to image forming apparatuses such as a plurality of printers, an information processing apparatus connected via network can always print documents on the same printer using user information, apparatus information, and content of the document etc. Thereby a data processing apparatus that makes management for each print job more efficient and improves information security can be presented.

This data processing apparatus can secure high security by outputting a document after executing modifying process on the document corresponding to environment of output destination even if a user prints out the document by mistake. Especially, this data processing apparatus can easily change, add, and delete a rule of modifying document content by changing categorizing information, adding and deleting modules. Also it is easy to add a rule of modifying document even after installing the system.

These features in this embodiment described above can be implemented by computer readable program written in object oriented program languages such as C, C++, C# and Java. That program can be presented storing in storage medium such as HDD, CD-ROM, MO, DVD, floppy disk, EEPROM, and EPROM, and also transferred via network.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application specific integrated circuits or by interconnecting an appropriate network of conventional component circuits, as will be readily apparent to those skilled in the relevant art.

What is claimed is:

1. A data processing apparatus, comprising:
a virtual printer driver unit to extract image data and job information data that includes identifying information to identify at least one information processing apparatus and its user from job data and output the image data and the job information data;
an output destination determining unit to determine a printing apparatus as an output destination from the output identifying information or content of the image data by referring to an association table;
an output destination type determining unit to determine which type the determined output destination corresponds to using registered categorizing information;
one or more modification processing units to execute mutually different modifying processes on content of the image data;
a determining unit to determine which modifying process to execute from the determined type by referring to content of a modifying process set for each categorized type; and
a print commanding unit to generate output data from the image data modified by a modification processing unit that executes the determined modifying process and the job information data and send the output data to the determined printing apparatus,
wherein content of the categorizing information and the modifying process can be customized.

2. The data processing apparatus according to claim 1, wherein the modification processing unit is generated by loading a module from among a plurality of modules to execute each modifying process, and the modification processing unit can be added or deleted by adding or deleting the module.

3. The data processing apparatus according to claim 1, further comprising a generating unit to generate the modification processing unit by loading a module to execute the determined modifying process.

4. The data processing apparatus according to claim 2, further comprising a generating unit to generate the modification processing unit for each of the modules by loading all the modules.

5. The data processing apparatus according to claim 1, wherein a first modification processing unit among the, one or more modification processing units determines whether or not a predefined string exists in a document as the content of the image data, and makes the whole document unreadable if the string exists.

6. The data processing apparatus according to claim 5, wherein the first modification processing unit makes the whole document unreadable by redacting the whole document.

7. The data processing apparatus according to claim 1, wherein a modification processing unit among the one or more modification processing units determines whether or not a predefined string exists in a document as the content of the image data, and marks the document if the string exists.

8. The data processing apparatus according to claim 1, wherein a modification processing unit among the one or more modification processing units determines whether or not predefined string exists in a document as the content of the image data and adds a user name that was extracted by the virtual printer driver unit and identifies the user to the document if the string exists.

9. A method of processing data on a plurality of different data-using apparatuses, comprising steps of:
extracting image data and job information data that includes identifying information to identify at least one information processing apparatus and its user from job data, and outputting the image data and the job information data;
determining an output destination printing apparatus from the output identifying information or content of the image data by referring to an association table;
determining which type the determined output destination printing apparatus corresponds to using registered categorizing information;
selectively executing mutually different modifying processes on content of the image data;

determining which modifying process to execute from the determined type by referring to content of a modifying process set for each categorized type;

generating output data from the image data modified by an executing step that executes the determined modifying process and the job information data and sending the output data to the determined printing apparatus; and customizing content of the categorizing information and the modifying process.

10. The method of processing data on the plurality of different data-using apparatuses according to claim 9, further comprising step a of selectively loading a module from among a plurality of modules to execute each modifying process, wherein adding or deleting the module adds or deletes the executing step.

11. The method of processing data on the plurality of different data-using apparatuses according to claim 9, further comprising a step of loading a module to execute the determined modifying process.

12. The method of processing data on the plurality of different data-using apparatuses according to claim 10, further comprising a step of loading all the modules.

13. The method of processing data on the plurality of different data-using apparatuses according to claim 9, further comprising steps of:

determining whether or not a predefined string exists in a document as the content of the image data; and making the whole document unreadable if the string exists.

14. The method of processing data on the plurality of different data-using apparatuses according to claim 13, further comprising a step of redacting the whole document.

15. The method of processing data on the plurality of different data-using apparatuses according to claim 9, further comprising steps of:

determining whether or not a predefined string exists in a document as the content of the image data; and marking the document if the string exists.

16. The method of processing data on the plurality of different data-using apparatuses according to claim 9, further comprising steps of:

determining whether or not a predefined string exists in a document as the content of the image data; and adding to the document a user name that identifies the user if the string exists.

17. A non-transitory computer-readable storage medium storing a program that, when executed by a computer, causes the computer to implement a method of managing a device using a data processing apparatus, the method comprising steps of:

extracting image data and job information data that includes identifying information to identify at least one information processing apparatus and its user from job data and outputting the image data and the job information data;

determining an output destination printing apparatus from the output identifying information or content of the image data by referring to an association table;

determining which type the determined output destination printing apparatus corresponds to using registered categorizing information;

determining which modifying process to execute from the determined type by referring to content of modifying process set for each categorized type;

generating an executing step by loading a module that executes the determined modifying process from among a plurality of modules that execute mutually different modifying processes on content of the image data; and generating output data from the image data modified by the executing step that executes the determined modifying process and the job information data, and sending the output data to the determined printing apparatus.

* * * * *